C. E. JOHNSON.
DYNAMO-ELECTRIC MACHINE CONSTRUCTION.
APPLICATION FILED FEB. 19, 1921.

1,428,889. Patented Sept. 12, 1922.

Inventor
Carl E. Johnson
by Graham + Muir
Attorneys.

Patented Sept. 12, 1922.

1,428,889

UNITED STATES PATENT OFFICE.

CARL E. JOHNSON, OF LOS ANGELES, CALIFORNIA, ASSIGNOR TO U. S. INDUSTRIES, INC., A CORPORATION OF CALIFORNIA.

DYNAMO-ELECTRIC-MACHINE CONSTRUCTION.

Application filed February 19, 1921. Serial No. 446,275.

*To all whom it may concern:*

Be it known that I, CARL E. JOHNSON, a citizen of the United States, residing at Los Angeles, county of Los Angeles, and State of California, have invented a new and useful Improvement in Dynamo-Electric-Machine Construction, of which the following is a specification.

My invention relates to dynamo electric machines and it is particularly applicable to induction motors.

The object of the invention is to provide a form of motor construction which will be very inexpensive and in which the ventilation will be exceptionally good.

A further object of the invention is to provide a form of construction which will be made up largely of punched or drawn sections so that only a small amount of material is used.

Further objects and advantages will be made evident hereinafter.

The invention is shown as applied to an induction motor.

The invention will probably be best understood if the method of assembling the parts shown is described.

Figure 1:
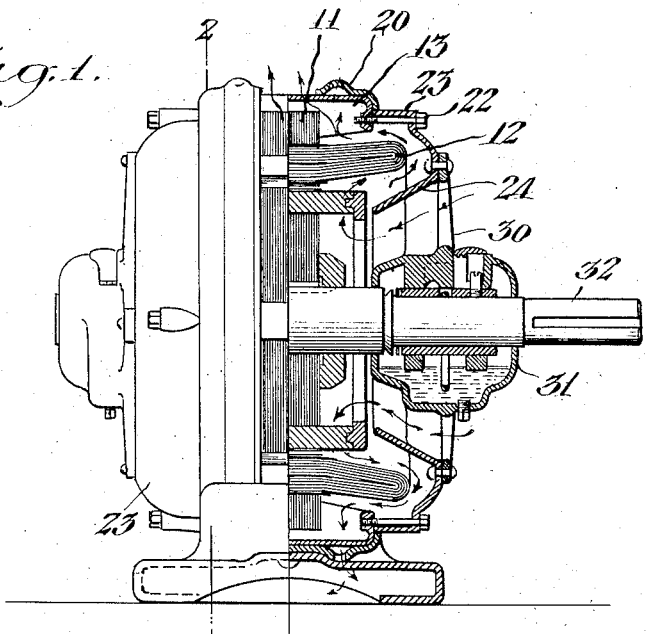
Fig. 1 is a view, a portion of which is in elevation and the remainder of which is in section.
Figure 2:
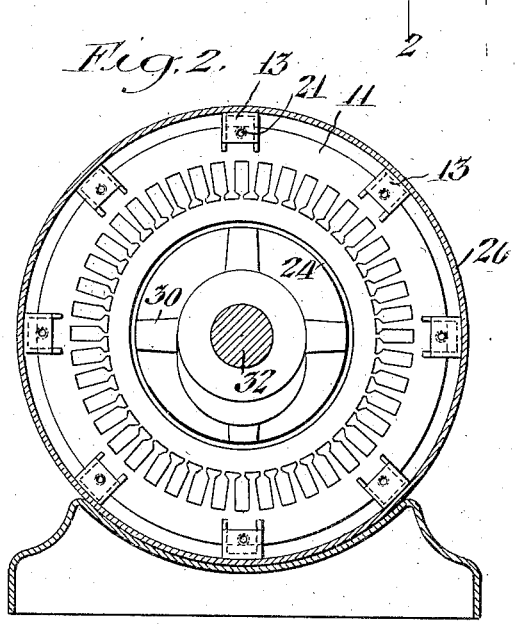
Fig. 2 is a section on a plane represented by the line 2—2 of Fig. 1, the rotating element of the motor being omitted for the sake of clearness.
Figure 3:
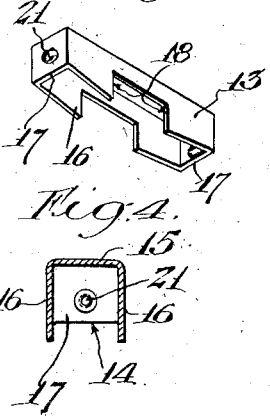
Fig. 3 is a perspective view of one of the clips.
Figure 4:
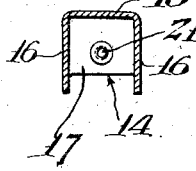
Fig. 4 is a section therethrough.

In the form of the invention shown a number of stator punchings 11 are assembled, these punchings consisting of annular discs of sheet iron having slots in which the stationary stator windings 12 are placed. The stator punchings are first assembled under pressure and while held under pressure, clips 13 are placed on the periphery thereof. The clips 13 are formed of sheet metal and consists of a box having an open bottom 14, a closed top 15, sides 16 and ends 17. The center of the sides 16 is slotted out as shown in 18, this slot being as wide as the assembly of the punchings to which the clip is to be applied. The punchings are held under pressure until the clips 13 are in place after which the pressure may be released, the punchings being thereafter held by the clips 13. Two retaining rings 20 are then placed outside the clips 13 fitting tightly therearound and holding them in place on the punchings 11. The retaining rings are secured on the ends of the clips 13 by spot welding, riveting or otherwise, and are of such length that a ventilating opening is left therebetween. The clips 13 are provided with an opening 21 at either end thereof in which bolts 22 are threaded, the bolts 22 passing through punched end bells 23 at either end of the motor. These end bells are provided with an inwardly projecting skirt 24 for the purpose of directing the air circulation as shown by the arrows in Fig. 1.

Riveted or otherwise secured to each of the ends bells 23 is a casting 30 carrying a bearing 31 in which a shaft 32 rotates. The shaft 32 carries the rotor which may be of standard construction.

It will be noted that by using the clips 13, the stator punchings 11 are held only at certain points, the whole outer periphery thereof being spaced away from the retaining ring 20 so that these punchings can be readily cooled by the circulation of air therearound.

I claim as my invention:

1. In a dynamo electric machine the combination of an assembly of stator punchings; clips on the periphery of said assembly projecting down on either side of said punchings and holding them together; a retaining member encircling said clips and preventing them from becoming disengaged from said punchings, and means for supporting said retaining member.

2. In a dynamo electric machine the combination of an assembly of stator punchings; clips on the periphery of said assembly projecting down on either side of said punchings and holding them together; a retaining member encircling said clips and preventing them from becoming disengaged from said punchings; end bells secured to said clips; bearings secured to said end bells, and means for supporting said retaining member.

3. In a dynamo electric machine the combination of an assembly of stator punchings; clips on the periphery of said assembly projecting down on either side of said punchings and holding them together; a retaining member encircling said clips and preventing them from becoming disengaged from said punchings, said retaining member being crimped over said clips at each end of each clip to prevent axial displacement of said clips and means for supporting said retaining member.

4. In a dynamo electric machine the combination of an assembly of stator punchings; clips on the periphery of said assembly projecting down on either side of said punchings and holding them together; a retaining member encircling said clips and preventing them from becoming disengaged from said punchings, said retaining member being crimped over said clips at each end of each clip to prevent axial displacement of said clips; end bells secured to said clips; bearings secured to said end bells, and means for supporting said retaining member.

5. In a dynamo electric machine the combination of an assembly of stator punchings, clips of substantially open box shaped form, the sides of said box being notched to receive and retain said assembly of punchings, the bottom of said box being parallel to a tangential plane touching the periphery of said assembly and the ends of said box being substantially parallel to the ends of said assembly; a retaining member encircling said clips and preventing them from becoming disengaged from said punchings, and means for supporting said retaining member.

6. In a dynamo electric machine the combination of an assembly of stator punchings, clips of substantially open box shaped form, the sides of said box being notched to receive and retain said assembly of punchings, the bottom of said box being parallel to a tangential plane touching the periphery of said assembly and the ends of said box being substantially parallel to the ends of said assembly; a retaining member encircling said clips and preventing them from becoming disengaged from said punchings; end bells secured to said clips; bearings secured to said end bells, and means for supporting said retaining member.

7. In a dynamo electric machine the combination of an assembly of stator punchings, clips of substantially open box shaped form, the sides of said box being notched to receive and retain said assembly of punchings, the bottom of said box being parallel to a tangential plane touching the periphery of said assembly and the ends of said box being substantially parallel to the ends of said assembly; a retaining member encircling said clips and preventing them from becoming disengaged from said punchings, said retaining member being crimped over said clips at each end of each clip to prevent axial displacement of said clips and means for supporting said retaining member.

8. In a dynamo electric machine the combination of an assembly of stator punchings, clips of substantially open box shaped form, the sides of said box being notched to receive and retain said assembly of punchings, the bottom of said box being parallel to a tangential plane touching the periphery of said assembly and the ends of said box being substantially parallel to the ends of said assembly; a retaining member encircling said clips and preventing them from becoming disengaged from said punchings, said retaining member being crimped over said clips at each end of each clip to prevent axial displacement of said clips; end bells secured to said clips; bearings secured to said end bells, and means for supporting said retaining member.

In testimony whereof, I have hereunto set my hand at Los Angeles, California, this 11th day of February, 1921.

CARL E. JOHNSON.